United States Patent Office 2,865,905
Patented Dec. 23, 1958

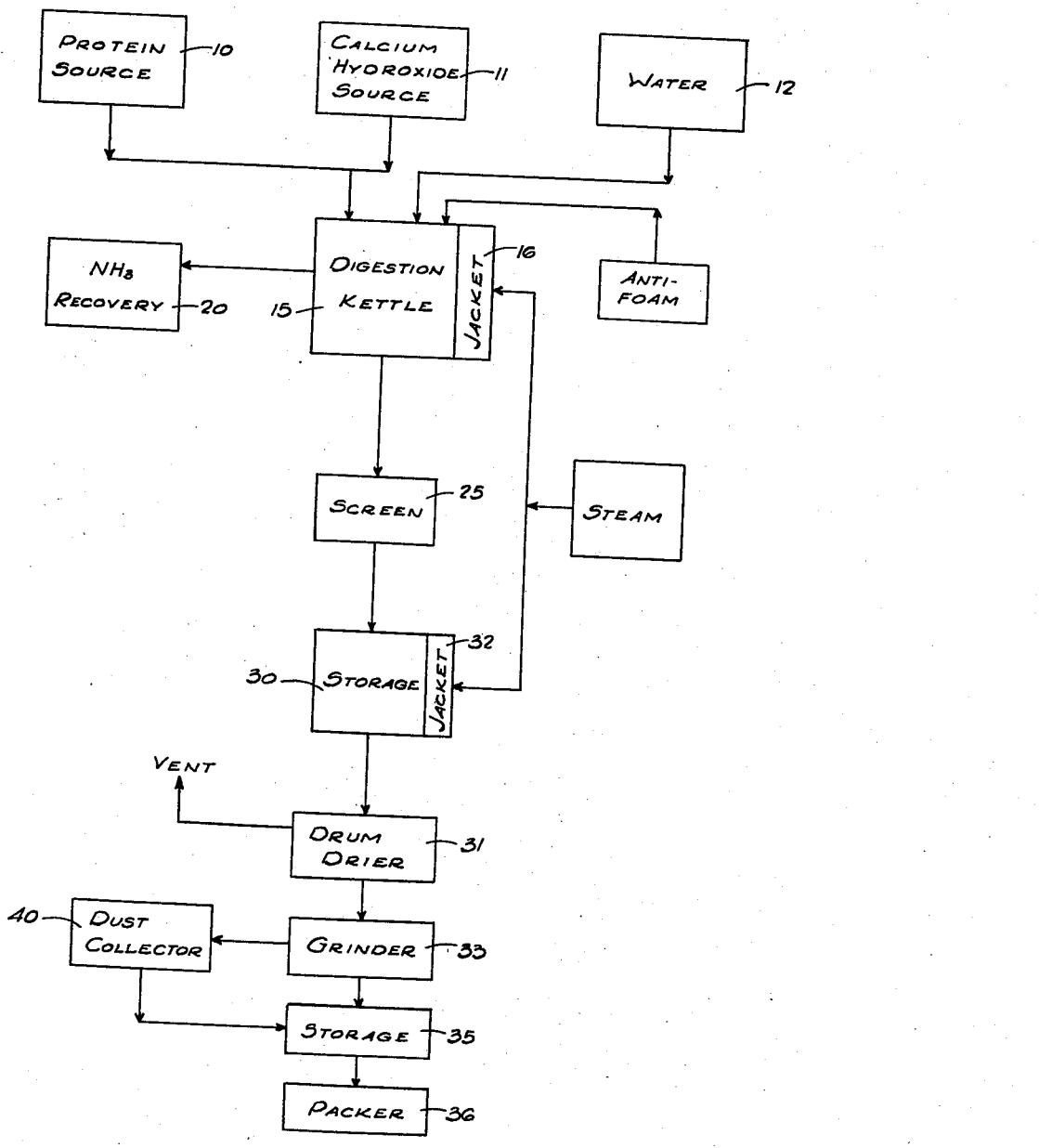

---

2,865,905

PLASTER RETARDER AND METHOD OF MAKING SAME

Robert R. Teale, Snyder, N. Y., assignor to National Gypsum Company, Buffalo, N. Y., a corporation of Delaware Application July 13, 1954, Serial No. 443,014

4 Claims. (Cl. 260—123.7)

This invention relates to proteinaceous retarder for plaster, or stucco, and to the process for making the same.

The use of a minor portion of hydrolyzed proteinaceous matter in calcined gypsum, or plaster, for the purpose of retarding the set or drying of plaster, is well-known in the art. The method of hydrolysis most commonly used for such proteinaceous matter, and described throughout the literature, consists either of the combined use of alkali metal hydroxides and alkaline earth hydroxides or of the use of alkali metal hydroxides followed by the addition of alkaline earth hydroxides following hydrolysis. Sodium hydroxide is generally considered a necessary hydrolyzing agent for the proteinaceous raw material, and calcium hydroxide, in the form of quicklime and water, is added to provide a carrying agent or reactant and drying agent.

The above described use of multiple hydroxides has been presumed normal and necessary throughout the art and not without good reason. The reaction of the calcium ion with the soluble amino anions of the protein provides the calcium proteinates which are recognized as the essential plaster retarding elements. Sodium hydroxide has been considered necessary to provide the desired degree of hydrolysis, because of its relatively greater caustic strength in comparison to calcium hydroxide.

A process for providing an equivalent plaster retarder including the use of a single hydroxide would be a very desirable simplification in comparison to the above described use of multiple hydroxides. This is especially true when the stronger caustic is eliminated, as the far greater problems of handling sodium hydroxide, in comparison to calcium hydroxide, can be well appreciated.

It is, therefore, an object of this invention to provide a process for the manufacture of proteinaceous plaster retarder with the use of a single hydroxide. A further object of the invention is the elimination of the more difficult to handle stronger caustic material from the process for producing proteinaceous retarder. Briefly, this is accomplished by the use of an alkaline earth hydroxide when reacted in accordance with the invention to provide both the hydrolyzing medium and the proteinate carrier for the active retarder anion.

Another object of the invention is to provide a substantially improved proteinaceous retarder for plaster, equal if not superior, in retarding strength to prior retarders.

A further object of the invention is to provide a retarder for plaster having a marked improvement in hygroscopicity, thus providing improved age resistance in storage.

A still further object of the invention is to provide a plaster of substantially improved setting characteristics and which forms a substantially improved plaster structure.

These and other objects of the invention will appear more fully when considered in connection with the following detailed description of preferred embodiments of the invention and the accompanying drawing in which:

Fig. 1 is a flow sheet showing diagrammatically the relation of the successive steps in the process of producing proteinaceous plaster retarder in accordance with the invention.

Referring now to Fig. 1, the three raw material supplies are seen across the diagram top, namely the protein source 10, hydrated lime 11, and water 12. Suitable mixture of the above said materials may be obtained with the following designated proportions:

| | Lbs. |
|---|---|
| Hoof meal | 100 |
| Hydrated high calcium lime | 20–30 |
| Water | 75–200 |

Hoof meal, or any other suitable protein source, preferably a keratin, is mixed with lime, both in a powder form, in a digestion kettle 15. Water, which is preferably preheated to a temperature in the order of 150° F., is added thereto. The kettle 15 is equipped with suitable agitators and surface scrapers. To avoid loss by foaming in subsequent steps of the process, an anti-foaming agent, such as tributyl phosphate is injected into the digestion kettle in finely dispersed form to mix initially with the digestion slurry. The kettle 15 is sealed closed to allow for pressure digestion, and is heated by steam jackets 16 on kettle 15 to a temperature in the order of 212° F. to 300° F., depending considerably on the type of proteinaceous material being digested, as evidenced by the following preferred conditions for hoof meal and hog hair.

| | | Example A. Hoof Meal | Example B, Hog Hair |
|---|---|---|---|
| Protein wt | pounds | 100 | 100 |
| Lime wt | pounds | 25 | 25 |
| Water wt | pounds | 100 | 100 |
| Anti-Foam wt | pounds | approx. 1½ | approx. 1 |
| Digestion time | minutes | 60 | 60 |
| Digestion temperature | ° F | 240 | 270 |
| Average kettle pressure | p. s. i. | 35 | 50 |

In lieu of indirect jacketed heating, heating steam may be fed directly to the kettle to heat by direct contact with the protein slurry being digested. However, the solids to liquid ratio is reduced by such direct heating, increasing the probability of subsequent foam problems and creating the need for a relatively greater amount of drying.

The above described digestion, void of any of the usual alkali metal hydroxides, has been found to hydrolyze the usual raw proteins substantially as previously hydrolyzed with soda ash, to provide a new and improved plaster retarder, as will be shown further hereinbelow.

Regardless of whether indirect or direct steam heating is employed, a sizable amount of $NH_3$ gas is built up in the digestion vapors, and thus on completion of one cycle of digestion, pressure will preferably be released in a controlled manner. Referring again to Fig. 1, the digestion vapors are released to an $NH_3$ recovery tank 20, wherein it is usual to remove at least as much ammonia as possible, such as by combining with water to form ammonium hydroxide by-product.

Depending on the source and type of raw materials used in the process, the digested material may need be screened as indicated at 25 to remove coarse grit, undigested bone, teeth, scrap, etc. Screening should be carried out with as little cooling and drying of the material as possible to avoid viscous material handling difficulties in the now relatively high-solids ratio slurry.

The hot, concentrated, screened, relatively ammonia free liquor is then stored in a vat 30, maintained at a temperature in the order of 160°–190° F. from whence it is continuously pumped to a drum drier 31. Vat 30 is heated by steam jackets 32 to maintain the abovesaid storage temperature. The liquor should be stored for as short a period as will be allowed by the drier capacity, approximately six hours of storage causing no effect, and up to approximately 24 hours being allowable. With storage of greater than about 24 hours, the retarding strength of the ultimate end product is reduced to an undesirable degree.

Drying may be effected by any of several suitable means, however in the present embodiment there is used a drum drier 31, which consists of two horizontally disposed, internally heated, closely spaced, parallel drums, rotating oppositely in a downward direction on the sides adjacent one another. The liquor is continuously fed to a bank resting in the concavity formed therebetween and is continuously drawn in film form between the drums, to which it adheres throughout over 180° of rotation. Elongate knives scrape the dried film or flakes from the drum surfaces. The drums are heated internally with steam of about 310° F., and the drums rotate at a speed in the order of 10–15 R. P. M. Drums are spaced apart to form films such that approximately 5–10 lbs. of product per square foot of drum are obtained per hour. Drying is carried on at such temperatures and at such a rate that the resultant dried retarder will have a moisture content of less than 5%.

Dried retarder is then ground to a more homogeneous fine-particle size, preferably a major portion passing through 100 mesh, by any suitable means 33 and conveyed to storage bins 35 and thence to packaging units 36. The provision of dust collecting means 40 on grinding equipment 33 is preferred, which dust may be fed directly to the storage bins 35.

The strength of various formulations of retarder as tabulated herebelow is obtained by determining the ratio of the amount of a standard prior art retarder to give a certain time for plaster to set divided by the amount of test retarder to give the same set. By multiplying this ratio by 100, the strength may be expressed as a percentage based on the standard retarder. A proper standard for consideration of strength of the novel retarder is the following prior art formula for protein retarder:

STANDARD—100% STRENGTH

| | |
|---|---|
| Protein (hoof meal) | gm 100 |
| Lime | gm 30 |
| NaOH | gm 2½ |
| Water | cc 200 |
| Time | min 30 |
| Temperature | °F 267 |
| Pressure | p. s. i. 40 |

Considering a retarder, made in accordance with the above prior art formula as having 100% standard retarding strength, the following formulations of retarder made in accordance with the invention are given in comparison and by way of examples:

Table I

| | (1) | (2) | (3) | (4) | (5) |
|---|---|---|---|---|---|
| Hoof Meal (gm.) | 100 | 100 | 100 | 100 | 100 |
| Lime (gm.) | 30 | 32½ | 35 | 20 | 40 |
| Water (gm.) | 150 | 150 | 150 | 150 | 150 |
| Time (min.) | 30 | 30 | 30 | 30 | 30 |
| Temperature (°F.) | 267 | 265 | 285 | 267 | 267 |
| Pressure (p. s. i.) | 40 | 41 | 62 | 25 | 35 |
| Strength (percent) | 100 | 107 | 105 | 92 | 92 |

From the above examples, it will be seen that ratios of lime to hoof meal from 20:100 to 40:100, when processed in accordance with the invention, provide, without the use of soda ash, a retarder substantially equivalent in retarding strength to prior retarders. The above range of ratios is directed, as shown, to a protein source of hoof meal, and it will be apparent that other protein sources may be expected to cause variations in the operating ranges of any of the critical conditions.

Table II

| | (1) | (6) | (7) | (8) |
|---|---|---|---|---|
| Hoof Meal (gm.) | 100 | 100 | 100 | 100 |
| Lime (gm.) | 30 | 30 | 30 | 30 |
| Water (gm.) | 150 | 100 | 80 | 250 |
| Time (min.) | 30 | 30 | 30 | 30 |
| Temperature (°F.) | 267 | 267 | 267 | 267 |
| Pressure (p. s. i.) | 40 | 35 | 30 | 30 |
| Strength (percent) | 100 | 101 | 92 | 96 |

Equivalent retarder was produced in accordance with the invention varying the water to protein ratios from 80:100 to 250:100, as shown above.

Table III

| | (9) | (10) | (11) | (12) | (13) |
|---|---|---|---|---|---|
| Hoof Meal (gm.) | 100 | 100 | 100 | 100 | 100 |
| Lime (gm.) | 32½ | 32½ | 32½ | 32½ | 32½ |
| Water (gm.) | 150 | 150 | 150 | 150 | 150 |
| Time (min.) | 20 | 30 | 45 | 60 | 90 |
| Temperature (°F.) | 267 | 267 | 267 | 267 | 267 |
| Pressure (p. s. i.) | 52 | 46 | 46 | 46 | 52 |
| Strength (percent) | 99 | 100 | 100 | 99 | 89 |

Table III indicates a possible variation of the novel process in time of digestion from about 20 to 60 minutes without substantial variation in the strength of the final protein retarder.

Table IV

| | (14) | (15) | (16) | (17) | (18) | (19) |
|---|---|---|---|---|---|---|
| Hoof Meal (gm.) | 100 | 100 | 100 | 100 | 100 | 100 |
| Lime (gm.) | 35 | 35 | 35 | 35 | 35 | 30 |
| Water (gm.) | 150 | 150 | 150 | 150 | 150 | 100 |
| Time (min.) | 30 | 30 | 30 | 30 | 30 | 90 |
| Temperature (°F.) | 225 | 240 | 255 | 270 | 285 | 220 |
| Pressure (p. s. i.) | 11 | 32 | 37 | 52 | 62 | 10 |
| Strength (percent) | 72 | 98 | 101 | 102 | 105 | 102 |

The results of varying the digestion temperatures is indicated by Table IV, showing the resultant change in the vat internal pressure due to temperature variation. Temperatures of 240° F. to 280° F. are preferred, since the ultimate yield in volume of end product tends to decrease somewhat at temperatures in excess of 280° F. and the time factor becomes excessive below 240° F., however temperatures in the order of 220° to 300° F. are contemplated in accordance with the invention. The elimination of the sodium hydroxide in the retarder made in accordance with invention, has provided a retarder which may be incorporated into gypsum plaster to retard the plaster set in a manner equivalent to the best known prior retarders. A material, definitely undesirable from the handling and cost standpoint, has been eliminated from a process in which it had always been considered a necessary evil, of no value in the end product.

The novel retarder when incorporated in plaster has thus far shown indications of providing an improvement in a completed plaster wall by a reduction of pocking of the wall surface, commonly termed "lime-popping." However, a sizable public use, with a substantial subsequent delay in time is necessary to conclude a study on this valuable phase of the invention.

Having completed a detailed disclosure of preferred forms of the invention so that those skilled in the art may practice the same, I contemplate that variations may be made without departing from the essence of the invention or the scope of the appended claims.

I claim:
1. The method of making high strength retarder for gypsum plaster comprising the steps of forming a slurry consisting essentially of 100 parts of keratin, 20 to 40 parts alkaline earth hydroxide, and 80 to 250 parts water, maintaining said slurry free of alkali metal compounds, hydrolyzing said slurry under a pressure greater than 30 lbs. per sq. in. for a period of 20 to 90 minutes at a temperature of from 220° F. to 300° F.

2. The method of making high strength retarder for gypsum plaster comprising the steps of forming a slurry consisting essentially of 100 parts of keratin, 20 to 40 parts calcium hydroxide, and 80 to 250 parts water, maintaining said slurry free of alkali metal compounds, hydrolyzing said slurry under a pressure greater than 30 lbs. per sq. in. for a period of 20 to 90 minutes at a temperature of from 220° F. to 300° F.

3. The method of making high strength retarder for gypsum plaster, comprising the steps of pressure hydrolyzing keratinous material in a slurry consisting essentially of said keratinous material, calcium hydroxide, and water, said keratinous material, calcium hydroxide and water being added to form said slurry in a relative weight ratio of substantially 100:25:100, maintaining said hydrolysis free of alkali metal compounds, adding an antifoam agent to said slurry, subjecting said slurry during said hydrolysis to steam having a super-atmospheric pressure of greater than 30 lbs. per sq. in. whereby said slurry is caused to rise quickly in temperature to a hydrolysis temperature of from 220° F. to 300° F., maintaining said slurry at said temperature and said pressure for a period of from 20 to 90 minutes, and drying the product thereof to a moisture content of less than 5%.

4. A high strength retarder for gypsum plaster, consisting of a substantially dry material, the moisture content thereof being less than 5%, said retarder being characterized by the absence of alkali-metal compounds, said retarder being the reaction product of an alkali-metal-compound-free hydrolysis of a slurry consisting of 100 parts by weight of keratin, from 20 to 40 parts by weight of calcium hydroxide, and from 80 to 250 parts by weight of water, said hydrolysis having been reacted under a pressure of greater than 30 lbs. per sq. in. for a period of from 20 to 90 minutes, at a temperature of from 220° F. to 300° F.

References Cited in the file of this patent

UNITED STATES PATENTS

| | | |
|---|---|---|
| 458,743 | Watson | Sept. 1, 1891 |
| 1,106,777 | Campbell | Aug. 11, 1914 |
| 1,106,778 | Campbell | Aug. 11, 1914 |
| 1,308,644 | Roll | July 1, 1919 |
| 1,683,539 | Gallagher | Sept. 4, 1928 |
| 1,787,162 | New | Dec. 30, 1930 |
| 2,212,470 | Friedrich | Aug. 20, 1940 |
| 2,324,951 | Ratzer | July 20, 1943 |
| 2,368,623 | Tresise et al. | Feb. 6, 1945 |
| 2,383,252 | Huntzicker et al. | Aug. 21, 1945 |